United States Patent
Hoelzle et al.

(10) Patent No.: US 9,769,875 B1
(45) Date of Patent: Sep. 19, 2017

(54) MULTIMEDIA MESSAGING PROXY FOR NON-COMPLIANT COMMUNICATION DEVICES

(71) Applicant: Sprint Communications Company L.P., Overland Park, KS (US)

(72) Inventors: Sean Patrick Hoelzle, Collegeville, PA (US); Nandana T. Maddumakumara, Overland Park, KS (US); Michael A. Carey, Manassas, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 325 days.

(21) Appl. No.: 14/205,676

(22) Filed: Mar. 12, 2014

(51) Int. Cl.
*H04W 68/02* (2009.01)
*H04W 88/18* (2009.01)
*H04W 12/06* (2009.01)

(52) U.S. Cl.
CPC ......... *H04W 88/182* (2013.01); *H04W 12/06* (2013.01)

(58) Field of Classification Search
CPC . H04L 67/1096; G06F 3/04886; H04W 68/02
See application file for complete search history.

(56) References Cited

U.S. PATENT DOCUMENTS

| 8,316,091 | B2 | 11/2012 | Hirvela et al. |
| 2010/0281268 | A1* | 11/2010 | Barreto ............... G06F 3/04886 713/182 |
| 2012/0303774 | A1* | 11/2012 | Wilson ................... H04L 67/26 709/223 |
| 2013/0173749 | A1* | 7/2013 | Wang ................. H04L 67/1095 709/217 |

* cited by examiner

*Primary Examiner* — Myron K Wyche (57) ABSTRACT

Embodiments disclosed herein provide systems and methods for allowing non-compliant communication devices to receive multimedia messages. In a particular embodiment, a method provides receiving, from a multimedia messaging system, a content identifier that a destination communication device will use to access content of a multimedia message transferred from a first communication device. The method further provides determining a device identifier for the destination communication device and inserting the device identifier into the content identifier. After inserting the device identifier, the method provides transferring the content identifier to the destination communication device.

20 Claims, 7 Drawing Sheets

MULTIMEDIA MESSAGING PROXY FOR NON-COMPLIANT COMMUNICATION DEVICES

TECHNICAL BACKGROUND

Communication devices, such as cell phones, are able to send and receive pictures, video, and audio as multimedia messages. When sending an item of multimedia in a multimedia message, a multimedia messaging system receives the item and stores the item. Any devices that are intended to receive the item are notified of the item's presence on the messaging server and provided with information necessary for the item to be retrieved. Upon receiving the information, the receiving devices use the information to request and receive the item stored on the multimedia messaging system.

Some multimedia messaging specifications, such as specifications provided by the Open Mobile Alliance (OMA), require that the receiving device identify itself when requesting to receive the stored item. The device identification helps ensure that the multimedia messaging system only transfers the item to the item's intended recipients. While many devices may be compliant with this requirement, other devices may not satisfy this requirement and are, therefore, not able to receive items sent via multimedia messaging.

OVERVIEW

Embodiments disclosed herein provide systems and methods for allowing non-compliant communication devices to receive multimedia messages. In a particular embodiment, a method provides receiving, from a multimedia messaging system, a content identifier that a destination communication device will use to access content of a multimedia message transferred from a first communication device. The method further provides determining a device identifier for the destination communication device and inserting the device identifier into the content identifier. After inserting the device identifier, the method provides transferring the content identifier to the destination communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
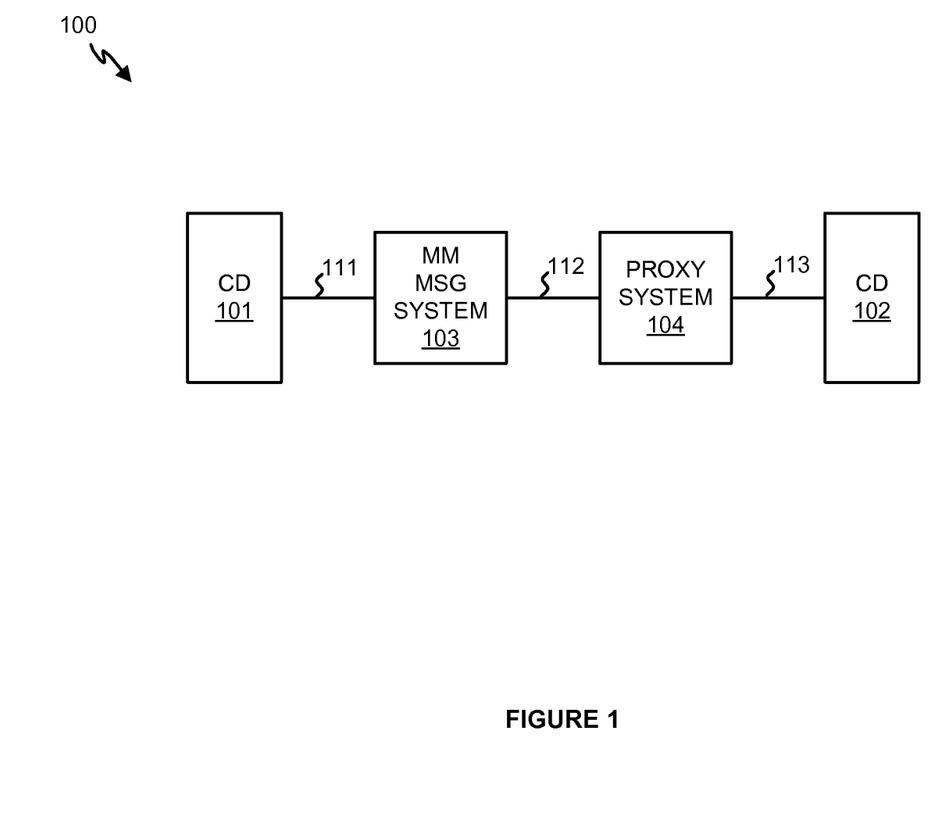
FIG. 1 illustrates a communication system for allowing non-compliant communication devices to receive multimedia messages.

FIG. 1 illustrates communication system 100. Communication system 100 includes communication device 101, communication device 102, multimedia messaging system 103, and multimedia messaging proxy system 104. Communication device 101 and multimedia messaging system 103 communicate over communication link 111. Multimedia messaging system 103 and multimedia messaging proxy system 104 communicate over communication link 112. Multimedia messaging proxy system 104 and communication device 102 communicate over communication link 113.

In operation, multimedia messaging system 103 facilitates the transfer of multimedia messages between communication devices. Specifically, multimedia messaging system 103 receives multimedia messaging content from sending devices, stores that content, and transfers retrieval information needed to retrieve that content to receiving devices. Upon receiving the retrieval information, the receiving devices use the information to retrieve the content from multimedia messaging system 103. In order to retrieve the content from multimedia messaging system 103, the receiving devices must identify themselves when requesting the content in accordance with an operating specification of multimedia messaging system 103. The identities of the receiving devices help to ensure that multimedia messaging system 103 only transfers the content to the proper receiving devices. Devices that do not comply with the specification and, thus, do not transfer their identity when retrieving content are unable to retrieve content from multimedia messaging system 103. Accordingly, multimedia messaging proxy system 104 operates, as described below, to allow such non-compliant devices to receive multimedia messaging content from multimedia messaging system 103.

Figure 2:
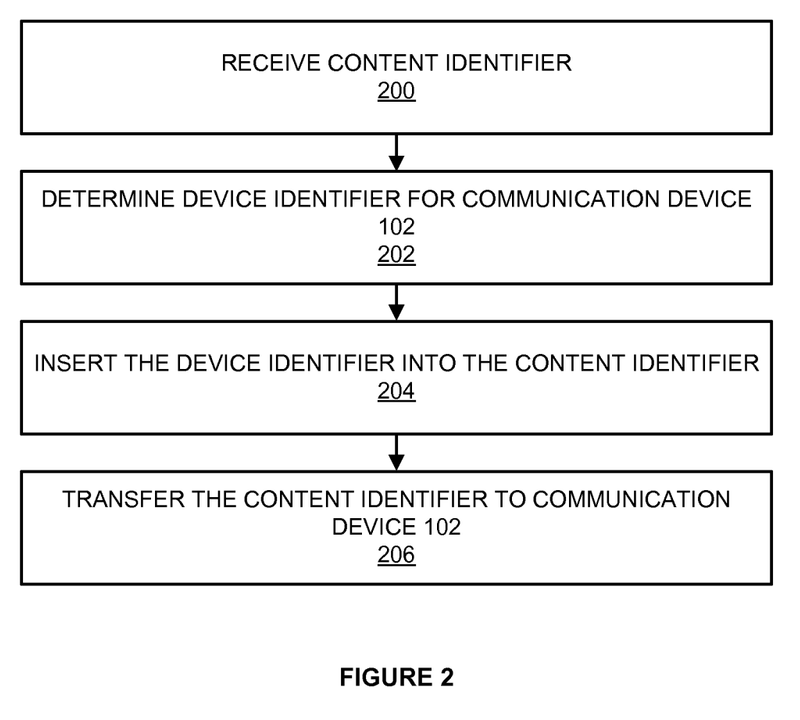
FIG. 2 illustrates an operation of the communication system to allow non-compliant communication devices to receive multimedia messages.

FIG. 2 illustrates a method of operating communication system 100 to allow non-compliant communication devices to receive multimedia messages. The method provides proxy system 104 receiving, from multimedia messaging system 103, a content identifier that destination communication device 102 will use to access content of a multimedia message transferred from communication device 101 (step 200). The method further provides determining a device identifier for destination communication device 102 (202) and inserting the device identifier into the content identifier (step 204). After inserting the device identifier, the method provides proxy system 104 transferring the content identifier to destination communication device 102 (step 206).

In some embodiments, proxy system 104 receives a request from destination communication device 102 indicating the content identifier and removes the device identifier from the content identifier. After removing the device identifier from the content identifier, proxy system 104 transfers the content identifier and the device identifier to multimedia messaging system 103. In particular, proxy system 104 transfers the content identifier and the device identifier to multimedia messaging system 103 in accordance with the multimedia messaging specification under which multimedia messaging system 103 is operating (e.g. proper format).

Advantageously, the above method allows multimedia messaging system 103 to transfer message content to receiving devices even if those devices are not able to properly identify themselves. Multimedia messaging system 103 may be aware of proxy system 104 during operation or proxy system 104 may operate transparently to multimedia messaging system 103.

In some embodiments, the device identifier may comprise a mobile directory number (MDN), an electronic serial number (ESN), international mobile subscriber identity (IMSI), media access control (MAC) address, Internet Protocol (IP) address, or some other means of identifying a device—including combinations thereof. The content identifier may include an uniform resource locator (URL), network address, memory location, unique identifier assigned to the content, or any other means of identifying an item(s) of content—including combinations thereof.

Referring back to FIG. 1, communication devices 101 and 102 each comprise communication circuitry for wired or wireless communications. The communication circuitry may include an amplifier, filter, modulator, and signal processing circuitry. Communication devices 101 and 102 may each also include a user interface, memory device, software, processing circuitry, or some other communication components. Communication devices 101 and 102 each may be a telephone, computer, e-book, mobile Internet appliance, wired network interface card, wireless network interface card, media player, game console, or some other wireless communication apparatus—including combinations thereof.

Multimedia messaging system 103 comprises a computer system and communication interface. Multimedia messaging system 103 may also include other components such as a router, server, data storage system, and power supply. Multimedia messaging system 103 may reside in a single device or may be distributed across multiple devices. Multimedia messaging system 103 could be a multimedia messaging service center (MMSC), server, mobile switching center, network gateway system, Internet access node, application server, service node, or some other communication system—including combinations thereof.

Multimedia messaging proxy system 104 comprises a computer system and communication interface. Multimedia messaging proxy system 104 may also include other components such as a router, server, data storage system, and power supply. Multimedia messaging proxy system 104 may reside in a single device or may be distributed across multiple devices. Multimedia messaging proxy system 104 is shown externally to multimedia messaging system 103, but system 104 could be integrated within the components of multimedia messaging system 103. Communication control system 103 could be a server, mobile switching center, network gateway system, Internet access node, application server, service node, or some other communication system—including combinations thereof.

Communication links 111-113 use metal, glass, air, space, or some other material as the transport media. Communication links 111-113 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-113 could be direct links or may include intermediate networks, systems, or devices.

Figure 3:
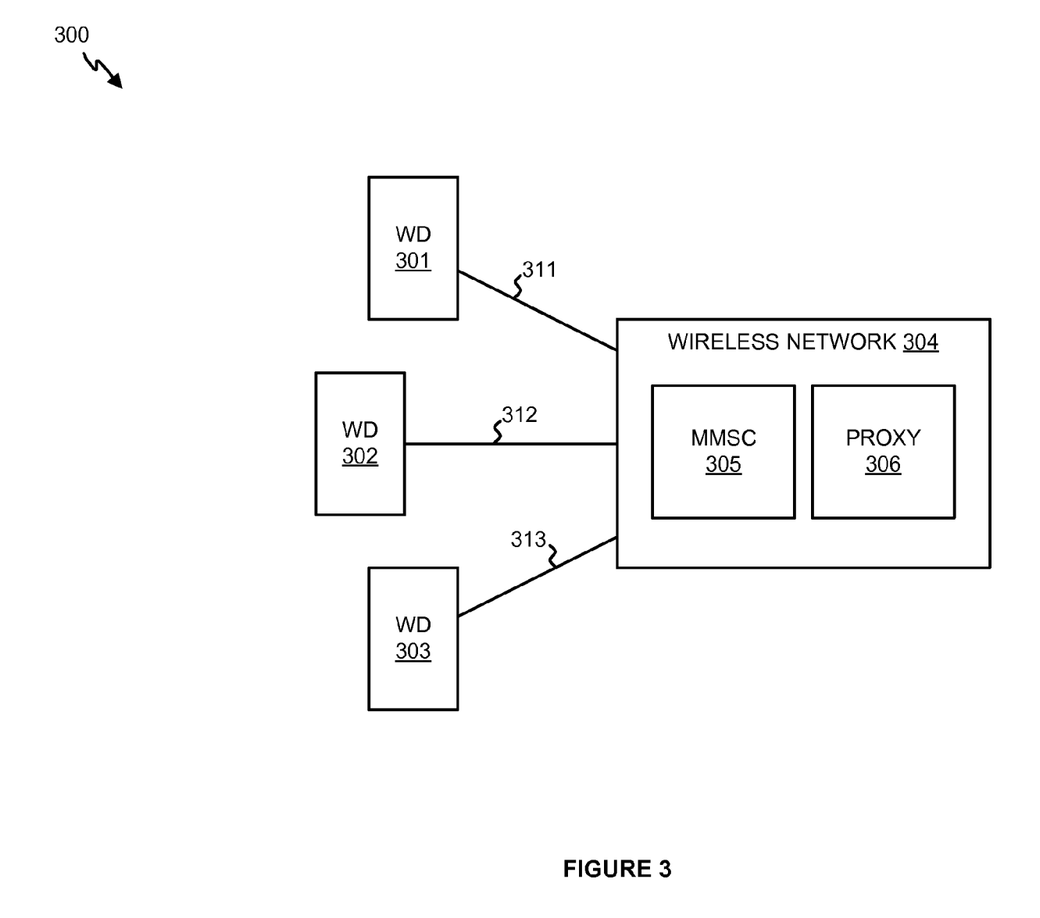
FIG. 3 illustrates a wireless communication system for allowing non-compliant communication devices to receive multimedia messages.

FIG. 3 illustrates wireless communication system 300. Wireless communication system 300 includes wireless communication devices 301-303 and wireless communication network 304. Wireless communication network 300 includes multimedia messaging service center 305 and proxy system 306. Wireless communication devices 301-303 and wireless communication network 304 communicate over wireless links 311-312.

In addition to systems 305 and 306, wireless communication network 304 includes network elements that provide communications services to wireless devices 301-303. Wireless network 304 may comprise switches, wireless access nodes, Internet routers, network gateways, application servers, computer systems, communication links, or some other type of communication equipment—including combinations thereof.

MMSC 305 operates using Open Mobile Alliance (OMA) specifications for the transfer of multimedia messaging service (MMS) messages. Accordingly, any request to retrieve MMS message content from MMSC 305 should contain the MDN of the requesting device as a Hypertext Transfer Protocol (HTTP) parameter. Should the request not contain the MDN of the requesting device, or not contain the correct MDN, MMSC 305 will not transfer the message content to the requesting device. Accordingly, devices that do not include their MDN when requesting MMS message content do not comply with the OMA specifications and will not be allowed to retrieve the requested content.

Figure 4:
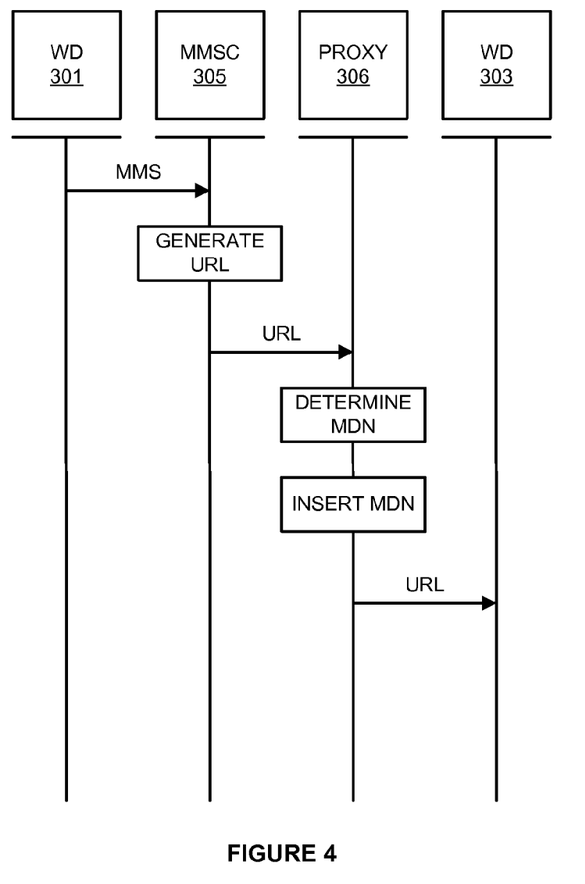
FIG. 4 illustrates an operation of the wireless communication system to allow non-compliant communication devices to receive multimedia messages.

FIG. 4 illustrates an operation of wireless communication system 300 to allow non-compliant communication devices to receive multimedia messages. In this operation, wireless device 301 is directed by a user to transfer a MMS message to wireless device 303, as identified by the mobile directory number (MDN) of wireless device 303. In this example, the MDN of wireless device 303 is "913-555-3477." Content of the MMS message may include one or more images, videos, audio, or text. To transfer the MMS message, wireless device 301 sends the MMS message to wireless network 304, which routes the MMS message to MMSC 305.

Upon receiving the MMS message, MMSC 305 stores the content of the MMS message, in either internal or external storage, and generates a uniform resource locator (URL) that wireless device 303 will use to retrieve the content. In this example, MMSC 305 generates "http://examplemms.com/message3684" as the URL. The URL is transferred from MMSC 305 to proxy system 306. MMSC 305 may explicitly transfer the URL in a message to proxy system 306 or proxy system 306 may intercept the URL as MMSC 305 intended to send the URL to wireless device 303.

In response to receiving the URL, proxy system 306 determines the mobile directory number (MDN) for the destination device, wireless device 303. The MDN for wireless device 303 propagated to MMSC 305 with the MMS message and then propagated on to proxy system 306 with a message including the URL in order to indicate that the respective messages are intended for wireless device 303. Thus, proxy system 306 determines the MDN as the intended destination of the message from MMSC 305 indicating the URL. The MDN for wireless device 303 is then inserted into the URL. For example, the MDN may be added to the end of the URL to create "http://examplemms.com/message3684-9135553477" as the URL after insertion, although, other manners of including the MDN of wireless device 303 into the URL may also be used.

After inserting the MDN of wireless device 303 into the URL, the URL is transferred from proxy system 306 in a message to wireless device 303. In particular, the URL may be transferred to wireless device 303 using a wireless application protocol (WAP) push message, such as a Push Access Protocol (PAP) message defined in WAP. In embodiments where proxy system 306 is operating transparently to MMSC 305, a message of the same type is used to transfer the URL to proxy system 306 from MMSC 305 because the MMSC 305, like proxy system 306, is intending for the message to be received by wireless device 303 to notify wireless device 303 of the MMS message content.

It should be understood that, while the above operation applies to an MMS message having a single receiving device, the MMS message may be directed to multiple devices via multiple MDNs. For example, the MMS message from wireless device 301 may be directed to wireless device 302 in addition to wireless device 303 via their respective MDNs. Accordingly, proxy system 306 will use two copies of the URL and insert the MDN of wireless device 302 into one of the URLs and the MDN of wireless device 303 into the other URL. Proxy system 306 then transfers the URL having the MDN of wireless device 302 to wireless device 302 and transfers the URL having the MDN of wireless device 303 to wireless device 303.

Figure 5:
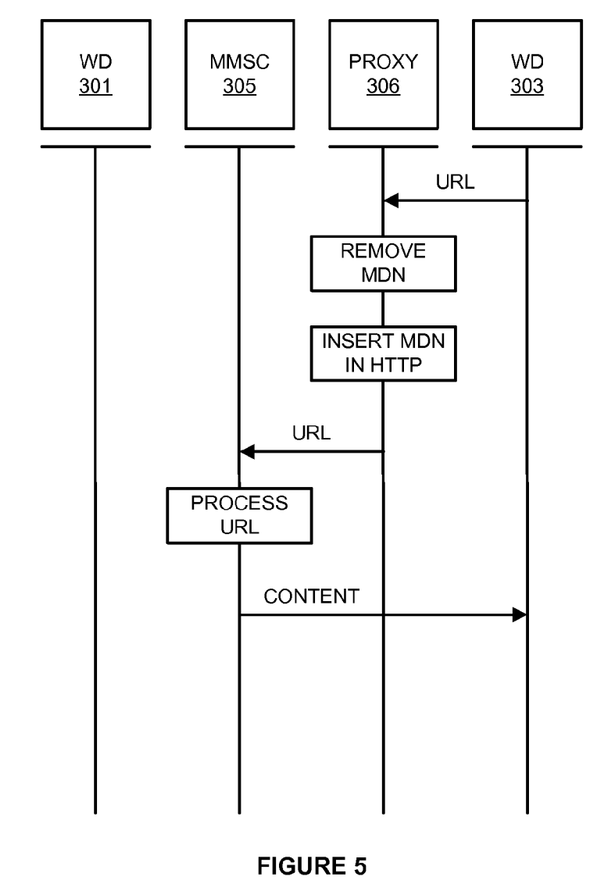
FIG. 5 illustrates an operation of the wireless communication system to allow non-compliant communication devices to receive multimedia messages.

FIG. 5 illustrates another operation of wireless communication system 300 to allow non-compliant communication devices to receive multimedia messages. Specifically, FIG. 5 may be a continuation of the operation described above with respect to FIG. 4. After wireless device 303 receives the message from proxy system 306, wireless device 303 uses HTTP to request the MMS message content using the URL. The request transfers the URL to proxy system 306. Proxy system 306 may be the intended recipient of the URL or the URL may be intended for MMSC 305 and is instead intercepted by proxy system 306 before MMSC 305 can receive it.

Upon receiving the URL from wireless device 303, proxy system 306 identifies the MDN of wireless device 303 from within the URL. For example, proxy system 306 may recognize the format of the URL and determines which portion of the URL is the MDN based on the format. Continuing the example from above, proxy system 306 may be configured to recognize any numbers coming after the dash in the URL are the numbers making up the MDN. Thus, proxy system 306 receives "http://examplemms.com/message3684-9135553477" and removes the dash and "9135553477" to revert the URL back to "http://examplemms.com/message3684".

When transferring the URL to MMSC 305, proxy system 306 transfers the URL with the MDN "9135553477" in an HTTP parameter. Thus, when MMSC 305 receives the request, in accordance with OMA standards, MMSC 305 determines whether the MDN included in the request is an MDN authorized to receive the content to which the URL is directed. That is, MMSC 305 confirms that the request indicates the MDN of a receiving device specified by wireless device 301 when originally transferred.

Upon determining that the MDN indicated with the URL is authorized to receive the message content, MMSC 305 transfers the message content to wireless device 303. The content may be transferred through proxy system 306 or may be transferred directly to wireless device 303. Therefore, even if wireless device 303 itself is not OMA compliant and not configured to indicate its MDN when requesting MMS message content, wireless device 303 can still receive MMS message content.

It should be understood that, while the above embodiments provide proxy system 306 as performing both the URL transmission (FIG. 4) and reception (FIG. 5) functionalities, the two functionalities may exist in separate systems or be incorporated into the functionality of MMSC 305.

Figure 6:
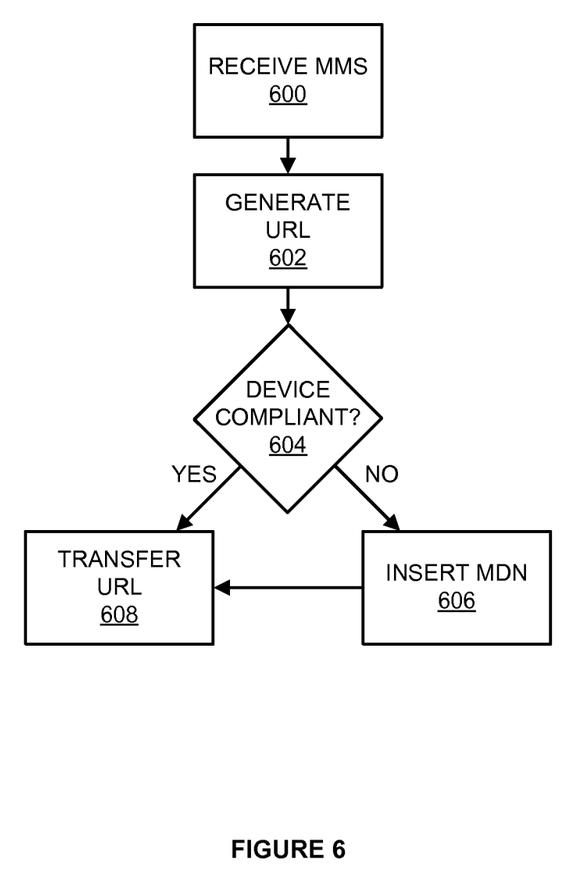
FIG. 6 illustrates an operation of the wireless communication system to allow non-compliant communication devices to receive multimedia messages.

FIG. 6 illustrates a further operation of wireless communication system 300 to allow non-compliant communication devices to receive multimedia messages. In the embodiments above, the operation of wireless communication system 300 either assumes that the receiving devices are not OMA compliant or performs in the same manner regardless of whether the receiving devices are OMA compliant. In contrast, the operations discussed above may only be performed for receiving devices that are not OMA compliant, as described below.

Specifically, wireless device 301 transfers an MMS message directed to wireless device 302, which is a non-compliant OMA device, and the MMS message is received by MMSC 305 (step 600). Subsequently, MMSC 305 stores the content of the message, generates a URL to access the content, and transfers the URL to proxy system 306 (step 602). Upon receiving the URL, proxy system 306 determines that wireless device 302 is a non-compliant OMA device (step 604). Proxy system 306 may access a database stored locally or in some other system in communication with proxy system 306 to determine that wireless device 302 is a non-compliant OMA device. The database stores information regarding which MDNs are associated with compliant or non-compliant devices.

Once proxy system 306 determines that wireless device 302 is non-compliant, proxy system 306 inserts the MDN of wireless device 302 into the URL (step 606). The URL is then transferred to wireless device 302 (step 608) so that wireless device 302 can use the procedure described in FIG. 5 to retrieve the content from MMSC 305.

In an alternative example, wireless device 301 transfers an MMS message directed to wireless device 303, which is an OMA compliant device, and the MMS message is received by MMSC 305 (step 600). Subsequently, MMSC 305 stores the content of the message, generates a URL to access the content, and transfers the URL to proxy system 306 (step 602). Upon receiving the URL, proxy system 306 determines that wireless device 303 is an OMA compliant device (step 604). Once proxy system 306 determines that wireless device 303 is compliant, the URL is transferred to wireless device 303 without inserting the MDN of wireless device 303 into the URL (step 608). Since wireless device 303 is OMA compliant, wireless device 303 does not need its MDN in the URL in order to retrieve the content of the MMS message.

In some embodiments, step 604 may be performed within MMSC 305 before MMSC 305 transfers the URL to proxy system 306. Accordingly, URLs destined for compliant devices are sent directly from MMSC 305 to the receiving device and URLs destined for non-compliant devices are routed through proxy system 306.

Figure 7:
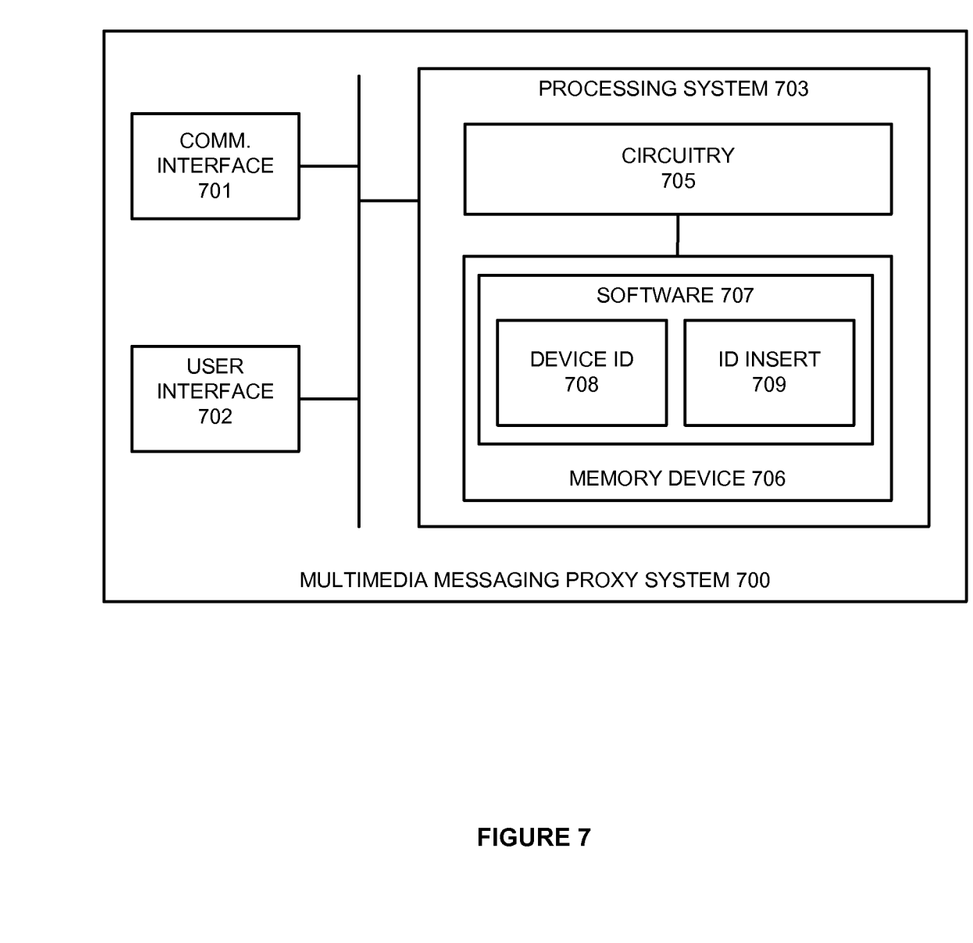
FIG. 7 illustrates a multimedia messaging proxy system for allowing non-compliant communication devices to receive multimedia messages.

FIG. 7 illustrates multimedia messaging proxy system 700. Multimedia messaging proxy system 700 is an example of multimedia messaging proxy system 104, although system 104 may use alternative configurations. Multimedia messaging proxy system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes device identifier module 708 and device identifier insertion module 709. Operating software 707 may further include an operating system, utilities, drivers, network interfaces, applications, or some other type of software. When executed by circuitry 705, operating software 707 directs processing system 703 to operate multimedia messaging proxy system 700 as described herein.

In particular, operating software 707 directs processing system 703 to receive, from a multimedia messaging system, a content identifier that a destination communication device will use to access content of a multimedia message transferred from a first communication device. Device identifier module 708 directs processing system 703 to determine a device identifier for the destination communication device. Device identifier insertion module 709 directs processing system 703 to insert the device identifier into the content identifier. After inserting the device identifier, device identifier insertion module 709 directs processing system 703 transferring the content identifier to the destination communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   receiving a Multimedia Messaging Service (MMS) message transferred from a first communication device containing a device identifier and a content identifier of a destination communication device that the destination communication device will use to access content of the MMS message from a multimedia messaging system;
   determining that the multimedia messaging system requires the destination communication device to indicate the device identifier when accessing content of the MMS message and that the destination communication device does not indicate the device identifier when accessing content of the MMS message and responsively inserting the device identifier into the content identifier; and
   after inserting the device identifier, transferring the content identifier to the destination communication device.

2. The method of claim 1, further comprising:
   receiving a request from the destination communication device indicating the content identifier;
   removing the device identifier from the content identifier; and
   after removing the device identifier from the content identifier, transferring the content identifier and the device identifier to the multimedia messaging system.

3. The method of claim 2, wherein the device identifier is transferred as a Hypertext Transfer Protocol (HTTP) parameter.

4. The method of claim 2, wherein the multimedia message system uses the device identifier to confirm that the destination communication device is supposed to receive the content of the MMS message.

5. The method of claim 1, further comprising:
   determining that the destination communication device indicates the device identifier when requesting to access the MMS message content and responsively transferring the content identifier to the destination communication device without inserting the device identifier into the content identifier.

6. The method of claim 1, wherein determining the device identifier comprises receiving the device identifier from the multimedia messaging system.

7. The method of claim 1, wherein transferring the content identifier to the destination communication device after the processing system inserts the device identifier comprises transferring a wireless application protocol (WAP) push message to the destination communication device.

8. The method of claim 1, wherein the content identifier comprises a uniform resource locator (URL).

9. The method of claim 1, wherein the device identifier comprises a mobile directory number (MDN).

10. The method of claim 1, wherein the content of the MMS message comprises an image.

11. A wireless communication system, comprising:
    an interface configured to receive a Multimedia Messaging Service (MMS) message transferred from a first communication device containing a device identifier of a destination communication device and a content identifier that the destination communication device will use to access content of the MMS message from a multimedia messaging system;
    a processing system configured to determine that the multimedia messaging system requires the destination communication device to indicate the device identifier when accessing content of the MMS message and that the destination communication device does not indicate the device identifier when accessing content of the MMS message, and in response, insert the device identifier into the content identifier; and
    the interface further configured to transfer the content identifier to the destination communication device after the processing system inserts the device identifier.

12. The wireless communication system of claim 11, further comprising:
    the interface configured to receive a request from the destination communication device indicating the content identifier;
    the processing system configured to remove the device identifier from the content identifier, and, after removing the device identifier from the content identifier, transfer the content identifier and the device identifier to the multimedia messaging system.

13. The wireless communication system of claim 12, wherein the device identifier is transferred as a Hypertext Transfer Protocol (HTTP) parameter.

14. The wireless communication system of claim 12, wherein the multimedia message system uses the device identifier to confirm that the destination communication device is supposed to receive the content of the MMS message.

15. The wireless communication system of claim 11, further comprising:
the processing system configured to determine that the destination communication device indicates the device identifier when requesting to access the MMS message content and responsively transfer the content identifier to the destination communication device without inserting the device identifier into the content identifier.

16. The wireless communication system of claim 11, wherein the processing system configured to determine the device identifier comprises the processing system configured to receive the device identifier from the multimedia messaging system via the interface.

17. The wireless communication system of claim 11, wherein the interface configured to transfer the content identifier to the destination communication device after the processing system inserts the device identifier comprises the interface configured to transfer a wireless application protocol (WAP) push message to the destination communication device.

18. The wireless communication system of claim 11, wherein the content identifier comprises a uniform resource locator (URL).

19. The wireless communication system of claim 11, wherein the device identifier comprises a mobile directory number (MDN).

20. The wireless communication system of claim 11, wherein the content of the MMS message comprises an image.

\* \* \* \* \*